United States Patent [19]

Mrotek et al.

[11] Patent Number: 5,688,615
[45] Date of Patent: Nov. 18, 1997

[54] BIPOLAR BATTERY AND METHOD OF MAKING SAME

[75] Inventors: Edward N. Mrotek, Grafton; Wen-Hong Kao, Brown Deer, both of Wis.

[73] Assignee: Globe-Union, Inc., Milwaukee, Wis.

[21] Appl. No.: 553,103

[22] Filed: Nov. 3, 1995

[51] Int. Cl.$^6$ ............................................ H01M 10/18
[52] U.S. Cl. .................................. 429/210; 429/233
[58] Field of Search ............................ 429/210, 131, 429/225, 228, 233, 162, 144

[56] References Cited

U.S. PATENT DOCUMENTS

| | | | |
|---|---|---|---|
| 4,125,680 | 11/1978 | Shropshire et al. | 429/4 |
| 4,197,178 | 4/1980 | Pellegri et al. | |
| 4,217,401 | 8/1980 | Pellegri et al. | |
| 4,275,130 | 6/1981 | Rippel et al. | 429/144 |
| 4,463,064 | 7/1984 | Ruch et al. | |
| 4,505,992 | 3/1985 | Dettling et al. | |
| 4,539,268 | 9/1985 | Rowlette | |
| 4,542,082 | 9/1985 | Rowlette | |
| 4,777,101 | 10/1988 | Blomberg et al. | |
| 4,900,643 | 2/1990 | Eskra et al. | |
| 4,925,744 | 5/1990 | Niksa et al. | 429/27 |
| 4,996,128 | 2/1991 | Aldecoa et al. | |
| 5,004,655 | 4/1991 | Symanski | |
| 5,045,170 | 9/1991 | Bullock et al. | |
| 5,068,160 | 11/1991 | Clough et al. | |
| 5,143,806 | 9/1992 | Bullock et al. | |
| 5,316,644 | 5/1994 | Titterington et al. | 204/284 |
| 5,326,656 | 7/1994 | Meadows et al. | 429/178 |
| 5,508,131 | 4/1996 | Bowen et al. | 429/210 |

OTHER PUBLICATIONS

"Formation of Lead Film Coating By Electroless Plating"; Atsuo Senda, Takuji Nakagawa, Yoshihiko Takano and Tohru Kasanami; Hyomen Gijutsu, vol. 43, No. 4, pp. 324–329 (1992) (Month N/A).

*Primary Examiner*—M. Nuzzolillo
*Attorney, Agent, or Firm*—Harness, Dickey & Pierce, P.L.C.

[57] ABSTRACT

A bipolar plate assembly includes a frame member having a center opening therethrough between parallel opposed surfaces, the opening being countersunk on one side of frame the member defining a mounting shoulder, and a bipolar element including a thin lead foil substrate having positive and negative active electrode material disposed on opposite surfaces, the bipolar element being mounted in the opening of the frame member with the marginal edge of the substrate located on the mounting shoulder and secured thereto by an adhesive resin, securing the bipolar element to said frame member, one or more such bipolar plate assemblies being stacked together between first and second terminal electrode assemblies to form a single or multi-element bipolar module having positive and negative terminals, and a plurality of the bipolar modules can be stacked together with their terminals electrically interconnected to form a multi-cell bipolar battery structure. Also disclosed is a method for making a substrate for a bipolar element for use in a bipolar battery, the method including plating a layer of lead onto the polymer fibers or particles using an electroless plating operation to form lead plated polymer particles, plating a thin layer of lead onto the lead plated polymer particles using an electrochemical process, and then forming the substrate by molding the lead coated polymer particles into a desired shape.

12 Claims, 5 Drawing Sheets

BIPOLAR BATTERY AND METHOD OF MAKING SAME

BACKGROUND OF THE INVENTION

This invention relates to bipolar lead-acid batteries, and more particularly, to an improved bipolar battery and to a method of making the bipolar battery.

Bipolar batteries have been proposed for use in applications where high rate discharge performance is required, such as in starting, lighting and ignition (SLI) systems for vehicles and most particularly in aircraft, electric cars and other vehicles where weight is an important consideration. Bipolar batteries are attractive as a substitute for conventional monopolar lead-acid batteries presently being used in such applications because the bipolar structure eliminates the need for the solid top lead and the lead grid elements used in monopolar acid-lead batteries, resulting in a lighter weight battery which generally is lower in cost than conventional monopolar acid-lead batteries.

Bipolar batteries include one or more cells or units, with each unit including a plate-like substrate having positive active material disposed on one side and negative material disposed on the opposite side, forming a bipolar plate. The active material is applied to the substrate by plating or by applying the material in the form of a paste onto the substrate. The substrates used for many bipolar batteries are made of metal, typically lead, because lead substrates are characterized by high conductivity and compatibility with the system. A bipolar battery is formed by mounting one or more bipolar elements between a pair of end plates which serve as the positive and negative terminals for the battery. Separators are located between adjacent cells in multi-unit structures. The bipolar elements and the end plates which form a battery module are secured together by ultrasonic or vibration welding or by nuts and bolts. One example of such bipolar battery is disclosed in the U.S. Pat. No. 4,539,268 issued to John J. Rowlette which is entitled "Sealed Bipolar Multi-Cell Battery".

Various arrangements have been proposed for minimizing the amount of lead contained in the substrate to produce light-weight, lead-acid batteries. For example, in the U.S. Pat. No. 5,068,160, issued to Thomas J. Clough et al., there is disclosed a bipolar battery that includes a plurality of bipolar plates each including a fiberglass mat that has positive and negative active material disposed on opposites thereof. Each of the bipolar plates is bonded to a frame element made of thermoplastic polymer material, forming a bipolar structure. A battery is formed by stacking a plurality of such bipolar structures together with end members and spacer members and securing the elements of the battery together using ultrasonic or vibrational welding, for example.

In another bipolar battery construction, disclosed in the U.S. Pat. No. 5,004,655 issued to James J. Symanski and entitled "Thin Bipolar Lead-Acid Battery With Individual Cell Vent," the bipolar battery includes a spacer element for supporting the battery components, such as the active material bearing substrates. The spacer element has its center portion cutout so that the spacer element resembles a frame. In this battery construction, the active material bearing substrates are mounted on the spacer element and affixed to the spacer element by a tape adhesive.

Another bipolar battery structure disclosed in the U.S. Pat. No. 4,900,643 issued to Eskra et al. and entitled, "Lead Acid Bipolar Battery Plate and Method of Making the Same", includes a substrate formed by a plastic conductive material with a mesh of metallic wire disposed therein and with active paste material disposed on opposite sides of the substrate.

Although such battery structures provide a reduction in weight, there is also a reduction in conductivity of the substrate material. Moreover, the pastes of active material do not adhere well to plastic substrates.

A further consideration is that containment systems presently available have not provided satisfactory support for the components of the battery, such as the substrates, the spacers, the separators and the electrodes. Although the use of thinner, light weight plates in the substrates is beneficial in reducing battery weight, the thinner plates present problems in providing a battery cell structure that is sufficiently strong and rigid to prevent structural failure during normal use.

SUMMARY OF THE INVENTION

The present invention provides a bipolar battery and a method of making the bipolar battery. In accordance with one aspect of the invention, a method for making a bipolar cell for a bipolar battery comprises the steps of: A method for making a bipolar cell for a bipolar battery, said method comprising the steps of:

forming a bipolar element by adhering a positive material to a first side of a planar foil element of electrically conducting material and adhering a negative active material to a second side of the foil element; mounting the bipolar element in a cutout portion of a frame member with edges of the substrate lying on an outer surface of the projection; and affixing the bipolar element to the outer surface of said projection frame.

In accordance with the invention, the bipolar battery comprises a rigid frame member having generally planar surfaces and a cutout portion whereby a frame is formed, the frame having parallel opposed surfaces the cutout portion being parallel to and spaced between the surfaces. A substrate having first and second generally planar surfaces with a positive electrode on one of the surfaces and a negative electrode on the other one of the surfaces. The substrate has a marginal edge portion. An adhesive means adheres the marginal edge portion of the substrate to the cutout portion of the frame.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF A PREFERRED EMBODIMENT

Referring FIGS. 1–5 of the drawings, the bipolar plate assembly 10 provided by the invention includes a frame member 12, a bipolar element 14 and a retainer member 16. The frame member 12 supports the bipolar element 14 about its edges with the center portion 15 of the bipolar element exposed within an open center portion of the frame member 12.

The frame member 12 is a rigid element which is generally rectangular in shape and has generally planar, parallel opposed top and bottom surfaces 24 and 26. The frame member has a center aperture 28 defining a rectangular shaped opening through the frame member between its opposed surfaces 24 and 26. The opening provides the frame member with an open center portion. The top surface 24 of the frame member 12 is stepped down or countersunk around the inner peripheral edge 29 of the opening 28, defining a support or mounting shoulder 30 that projects into the opening 28 from the inner edge 29 of the frame member.

Figure 3:
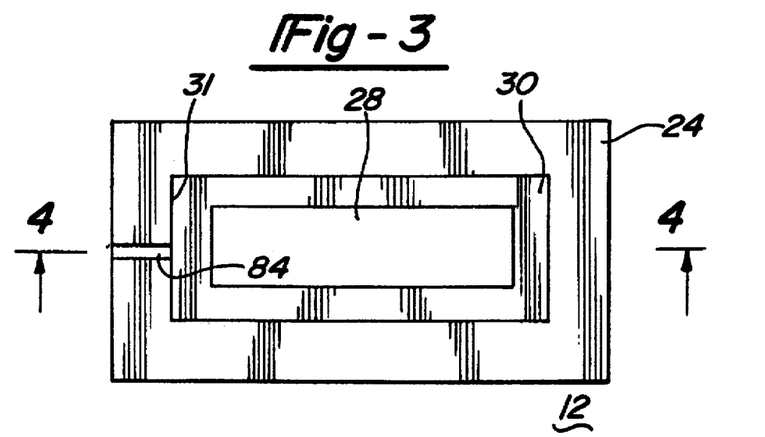
FIG. 3 is a top view of a frame member of the bipolar plate assembly shown in FIG. 1.
Figure 4:
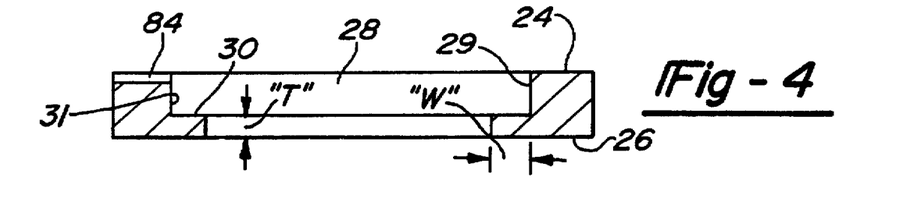
FIG. 4 is a section view of the frame member taken along line 4—4 of FIG. 3.

Preferably, the frame member is made of a plastic material, such as polyethylene. However, the frame member can be made of other materials, such as insulating or dielectric polymers, depending upon application. The frame member can be produced using an injection molding process or other molding processes. In the exemplary embodiment, the frame member is 6.5 inches in length, 10 inches wide and 0.12 inch thick. The width of the frame member from the inner peripheral edge 29 of the opening 28 to the outer peripheral edge 31 of the frame member is 0.50 inch. The width "W" of the shoulder 30 is 0.12 inch and the thickness "T" of the shoulder 30 is 0.02 inch.

Figure 1:
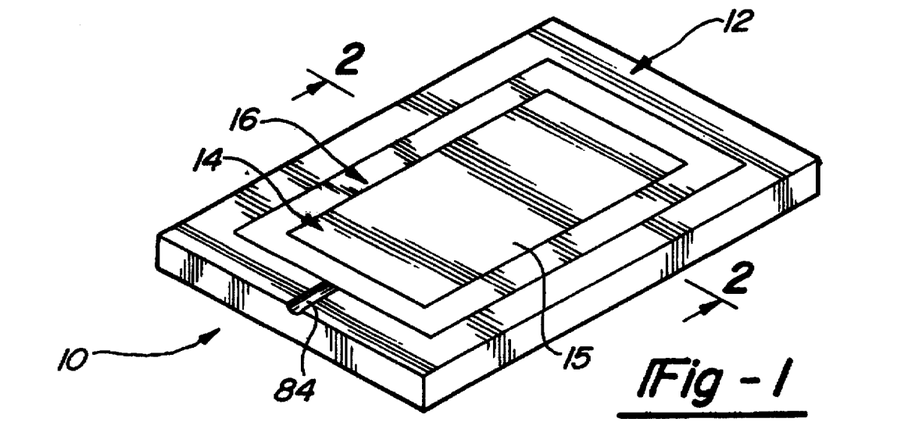
FIG. 1 is a perspective view of a bipolar plate assembly provided by the invention.
Figure 2:
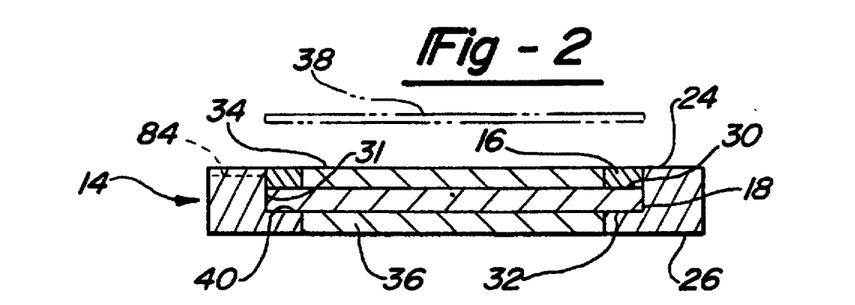
FIG. 2 is a section view of the bipolar plate assembly taken along the line 2—2 of FIG. 1.

The bipolar element 14 includes a substrate 18 which is a very thin, lead foil element, rectangular in shape, having first and second generally planar opposed surfaces 30 and 32 with a positive active material 34 disposed on one surface 30 and a negative active material 36 disposed on the other surface 32. The positive and negative active materials 34 and 36 do not extend all the way to the peripheral edges of the substrate. Rather, the active materials are spaced inwardly from the peripheral edges of the substrate a distance corresponding to the width of the shoulder 30.

The substrate is supported on the shoulder 30 of the frame member and secured to the frame member in a manner to be described. To this end, the bipolar element is dimensioned to fit in the recess defined in the upper surface of the frame member 12, with the peripheral edge of the substrate 18 located on the shoulder 30 and with the negative active material 36 located within the lower portion 33 of the opening and with the positive active material spaced inwardly from the vertical side wall of the frame member. The frame member functions as the support element for the bipolar element of the battery cell. Stated in another way, the substrate 18 is not a supporting element. Accordingly, the foil element 18 can be very thin and in the exemplary embodiment is 0.010 inch. Using a very thin foil element reduces the weight of the bipolar element and also minimizes the length of the conductive path through the substrate, lowering the internal resistance of the cell.

In the exemplary embodiment, the lead foil 18 is covered with a coating of barium metaplumbate ($BaPbO_3$). One process for coating lead with $BaPbO_3$ is disclosed in the U.S. Pat. No. 5,143,806 issued to Norma Bullock and Wen-Hong Kao. The positive and negative active materials 34 and 36 are made of conventional paste or high performance paste with or without additives for formation and performance enhancement as is known in the art. The positive and negative active materials are directly pasted onto the lead foil substrate. Alternatively, the active materials can be pasted onto grids or expanded metal and the coated grids can be pressed or laminated onto the lead foil substrate. The active materials can be extruded to form a ribbon that is cut to size and then pressed or laminated onto the lead foil substrate. The bipolar element 14 can be cured using state of the art curing technology.

Digressing, in accordance with another aspect of the invention, the substrate for the bipolar plate assembly can be made using a three-step process in which the substrate is formed from polymer fibers that are coated or otherwise covered with lead. The lead is distributed along the grains of polymer fibers. By way of example, the polymer fibers can be high density ⅛ inch polyetheylene pellets, such as those commercially available under the tradename Alathon 7245. A process flow chart illustrating the three-step process is given in FIG. 14.

Figure 14:
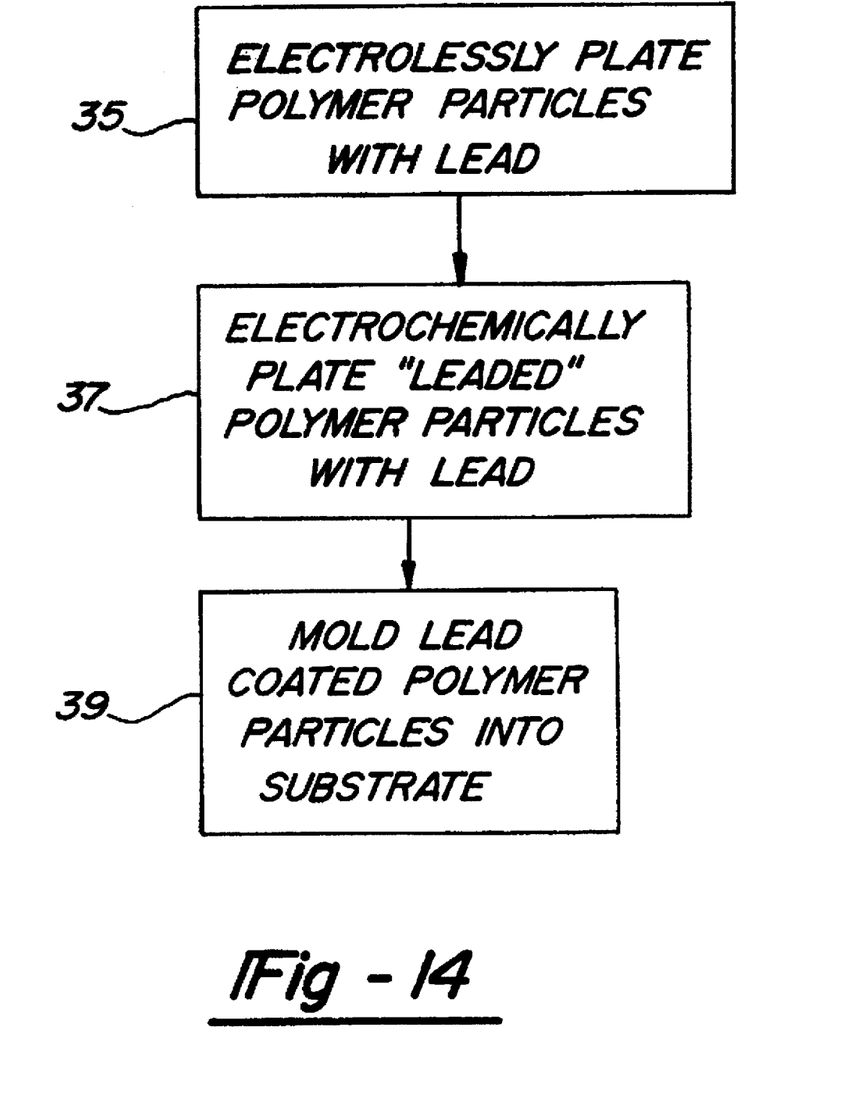
FIG. 14 is a flow chart illustrating the process for producing a substrate for the bipolar plate assemblies provided by the invention.

Referring to FIG. 14, in the first step of the process, represented by block 35, a layer of lead is plated onto the polymer particles using an electroless plating operation. By way of example, the thickness of the lead layer typically is less than 2 μm and the duration of the plating time is less than 60 minutes. One process suitable for this is disclosed in an article entitled "Formation of Lead Coatings By Electroless Plating" by A. Senda, T. Nakagawa, Y. Takano, and T. Kasanami, in Hyomen Gijutsu, Volume 43, No. (4) pages 324–9, (1992).

In the second step of the process, represented by block 37, a thin layer of lead is plated onto the "leaded" polymer using an electrochemical technique, such as a tumbling plating technique. Such plating procedures are known in the art. A preferred thickness for the layer of lead is less than 100 μm.

Then, in the third step of the process, represented by block 39, the lead coated polymer particles are molded, using a compression molding process, to form a slab of the substrate material, followed by cutting the substrate material to the desired size. A grid pattern can be formed on the substrate in any suitable manner to improve paste adhesion.

Depending upon the polymer material used, the lead in the substrate can be sintered to improve the crystallinity and thus the resistance of the substrate to corrosion by the electrolyte that is introduced into the bipolar cell. Advantages of this process include control of loading level and consistency in conductivity. Another advantage is that this method affords the possibility of sintering lead in the polymeric matrix to improve corrosion resistance.

The bipolar element 14 is mounted on the frame member 12 located in the center opening thereof. The bipolar element 14 is affixed to the frame member 12 by an adhesive, which is indicated at 40, which is applied to the marginal edge portions of the substrate and/or to surfaces of the frame member. In accordance with another aspect of the invention, the adhesive that is used comprises a resin that is polyacrylate in nature. The resin contains aliphatic chains with carboxylic acid and/or carboxylate functional groups, for example, tri-(n-octyl, n-decy)trimellitate, triisodecyl trimellitate, poly(hexyl methacrylate), poly(2-ethylhexyl methacrylate), or poly(isodecyl methacrylate) and compounds or mixtures thereof. Alternatively, the resin can contain aromatic chains with carboxylic acid and/or carboxylate functional groups. One example of a resin that is particularly suitable for this application is commercially available from Goshen Die Cutting, Goshen Ind., under the trade name THERMOLOK. Such adhesive is particularly suitable for this application because the resin 40 adheres both to plastic and to lead without special treatment of the surfaces of the parts that are being joined together, creating a bond between the plastic material of the frame member 12, and the retainer 16, and the lead based active material of the bipolar element 14.

The adhesive resin 40 is applied to the shoulder 30 of the frame member and then, the bipolar element 14 is positioned on the shoulder 30. The adhesive resin 40 can also be applied to the lower portion of the vertical side surface 31 of the frame member to secure the edges of the substrate to the frame member. To render the resin 40 useful as an adhesive, the resin is dissolved in a solvent such as toluene or trichloroethane. The adhesive resin 40 in liquid or semi-liquid form is applied to the appropriate surfaces of the substrate using a paint brush or by spraying. Alternatively, the resin 40 can be loaded into a heat gun and squeezed out of the nozzle of the heat gun onto surfaces of the substrate.

Figure 5:
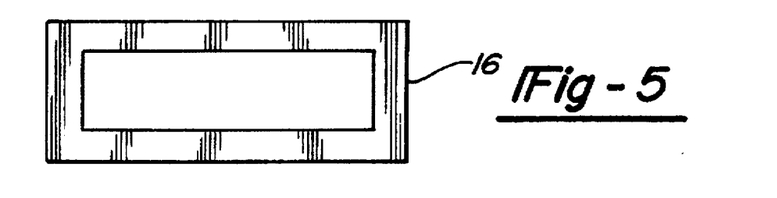
FIG. 5 is a plan view of a retainer element of the bipolar plate assembly shown in FIG. 1.

Referring to FIGS. 2 and 5, the retainer member 16 is rectangular in shape and having an outer dimension corresponding to that of the shoulder 30. The retainer member 16 is sized to fit into the gap or space between the inner surface of the frame and the edge of the active material. The retainer 16 rests on the top surface of the peripheral edge of the substrate 18 and assists in securing the bipolar element to the frame member. As is shown in FIG. 2, the top surface of the retainer member 16 is flush with the top surface 24 of the frame member and the active material. Preferably, the retainer member is secured to the upper surface of the substrate 18 by a layer of the adhesive resin 40. However, the retainer member can be sized relative to the width of gap between the inner surface 31 of the frame and the active material so as to be maintained on the shoulder 30 by interference fit between the vertical surface 31 of the frame and the active material. The retainer member can be made of the same material as the frame member, or of any other suitable material.

The frame member 12 and the retainer member 16 support the relatively thin substrate and also provide a seal around the peripheral edge of the substrate which substantially prevents ion transfer through the substrate. The positive and negative active materials 34 and 36 are exposed at the upper and lower ends of the bipolar plate assembly.

Figure 6:
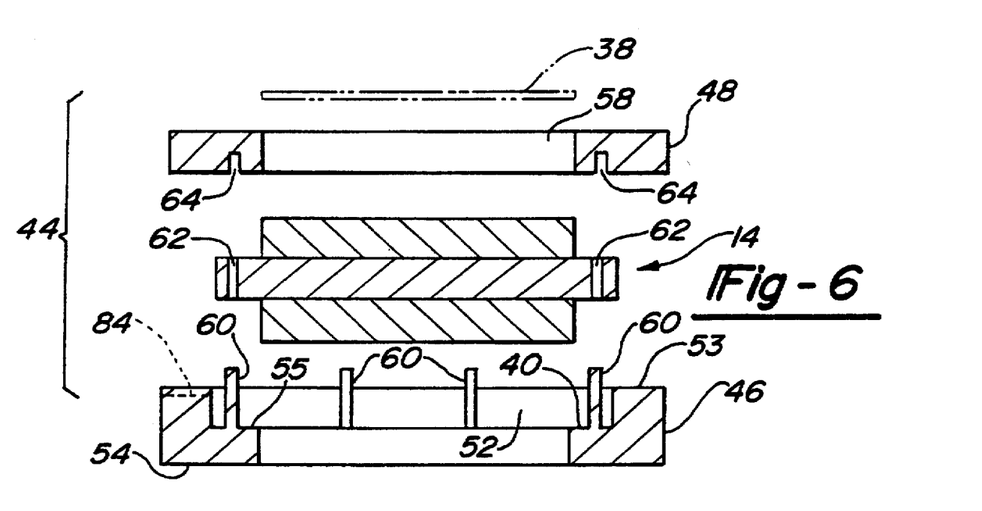
FIG. 6 is an exploded view in cross-section of a further embodiment of a bipolar plate assembly provided by the invention.
Figure 7:
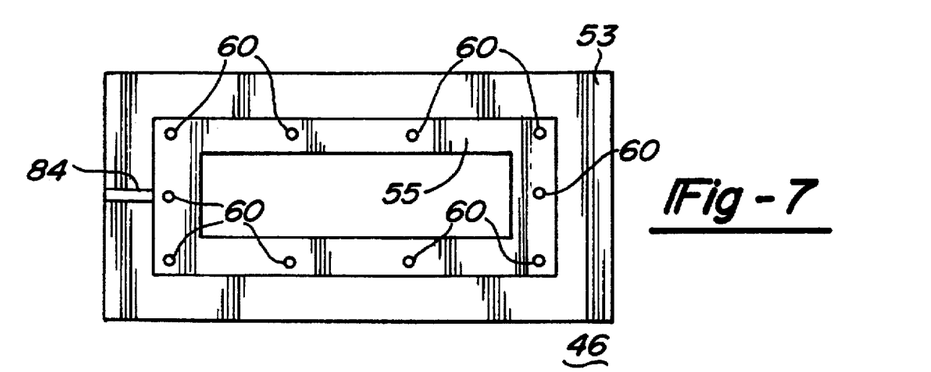
FIG. 7 is a top plan view of a frame base member of the bipolar plate assembly shown in FIG. 6.
Figure 8:
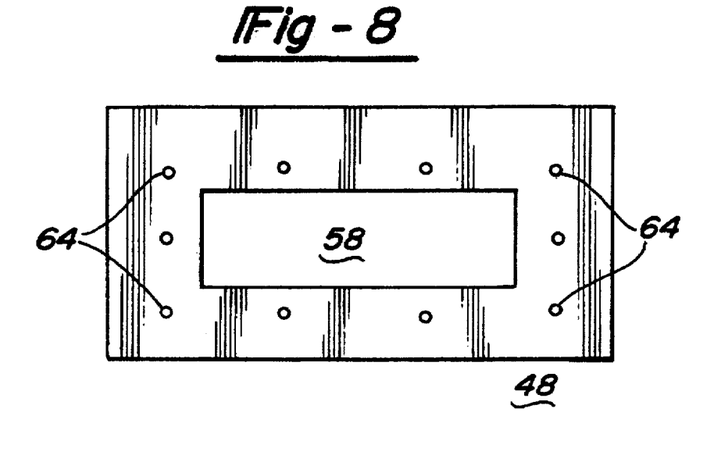
FIG. 8 is a bottom view of an frame retainer member of the bipolar plate assembly shown in FIG. 6.
Figure 9:
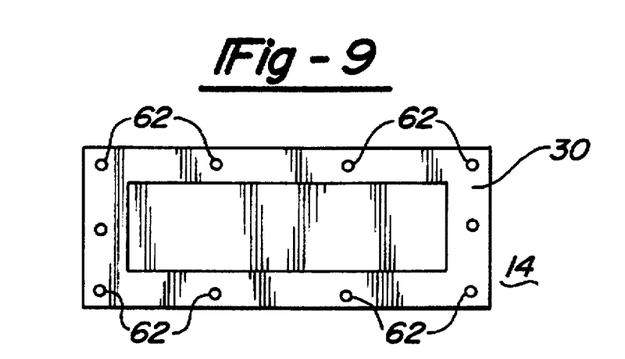
FIG. 9 is a plan view of the bipolar element of the bipolar plate assembly shown in FIG. 6.

Referring to FIG. 6, in accordance with a further embodiment, a bipolar plate assembly 44 includes a two-piece frame assembly including a frame base member 46 and a frame retainer member 48 that are adapted to be mounted together with the bipolar element 14 sandwiched between the two frame members. The frame base member 46 is similar in size and configuration to the frame member 12 shown in FIGS. 1-5, and includes a center opening 52 through the frame base member 46 between its top surface 53 and its bottom surface 54. The top surface of the frame base member is stepped down along the peripheral edge of the opening 52, forming a shoulder 55 along the inner peripheral edge of the opening. The frame retainer member 48 is adapted to mate with the frame base member 46 and has an center opening 58 corresponding in size and shape to the center opening 52 in the frame base member 46.

In the embodiment illustrated in FIG. 6, the frame base member 46 includes a plurality of indexing elements, embodied as alignment pins 60, for aligning the elements that form a battery cell. The alignment pins 60 are formed integrally with one of the frame members and pass through holes 62 formed in the substrate about the peripheral edges thereof and are received in holes 64 formed in the lower surface of the frame retainer member 50 that are constructed and arranged to receive the alignment pins. The alignment pins 60 and the holes 62 are generally cylindrical in shape and have a circular cross section. In the exemplary embodiment, the frame base member includes four or more alignment pins and the frame retainer member includes a corresponding number of holes located in registry with the alignment pins. The holes 62 are punched or stamped in the marginal edges of the substrate in a pattern that matches the pattern of alignment pins and holes in the frame member. The holes 62 in the substrate are located in the portion of the substrate that is clamped between the frame member and the retainer member. However, the frame base member 46 can have a smooth upper surface, i.e., the frame base member and the frame retainer member can be provided without respective alignment pins and mating holes.

The frame base member and frame retainer member clamp the bipolar element therebetween by the edges of the substrate, supporting the bipolar element 14 within the assembled frame base and retainer members with the upper surface of the positive active material being exposed at and being substantially flush with the upper surface of the frame and with the lower surface of the negative active material being exposed at and being substantially flush with the lower surface of the frame. The clamping arrangement afforded by the frame substantially prevents ion transfer between the active material bearing surfaces of the substrate.

In the exemplary embodiment, the substrate 14 is glued to the shoulder 55 of the frame base member 46 using the adhesive resin 40 on the top surface of the frame base member. The adhesive resin 40 is applied to the top side of the substrate and then the frame retainer member 48 is mounted on the thus assembled frame base member and substrate to complete the bipolar plate assembly 44. The frame base and retainer members can be secured together using a heat sealing process with or without the adhesive resin 40.

Figure 10:
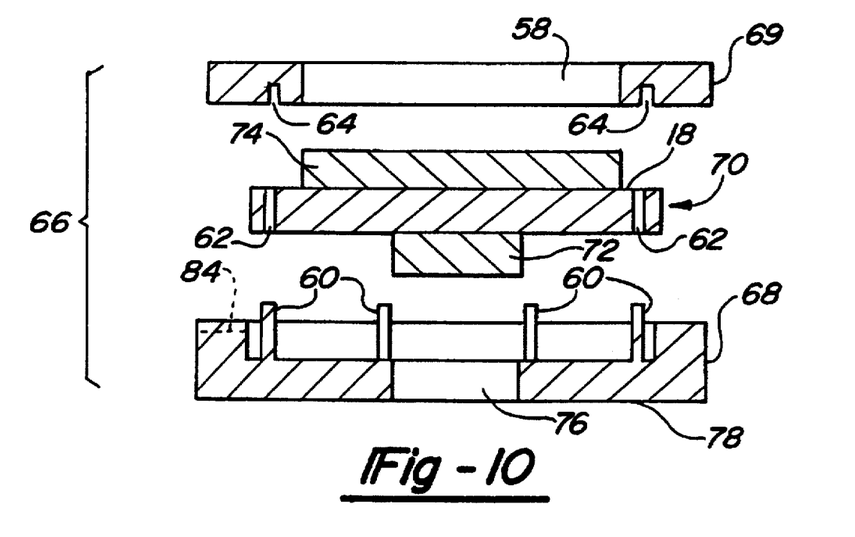
FIG. 10 is an exploded side view, in section, of a terminal assembly for use in forming a battery cell.
Figure 11:
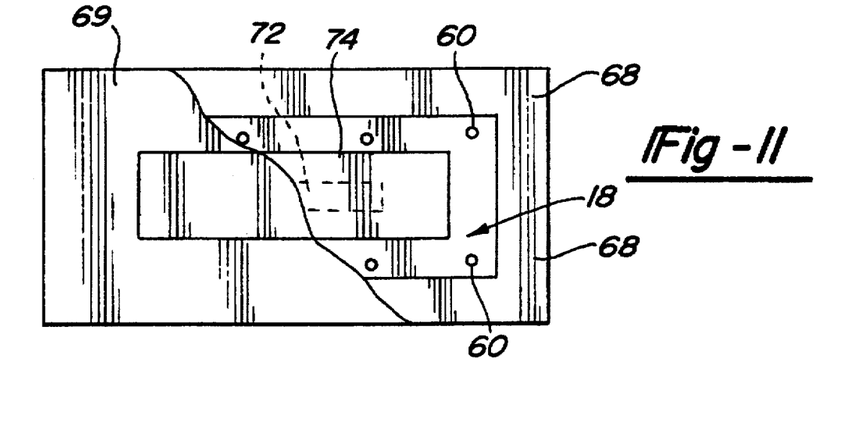
FIG. 11 is a plan view of an end plate of the terminal assembly that is shown in FIG. 10, with the upper frame member partially broken away.

Referring to FIGS. 10 and 11, there is shown a terminal assembly 66 which includes an end plate 68, frame member 69, a monoplate element 70, and a terminal conductor 72. The end plate 68 and frame member 69 are similar in size and shape to the frame members 46 and 48 shown in FIG. 6, for example, but end plate 68 does not include an opening corresponding to opening 52. However, the center portion of the end plate is recessed to define a compartment having a shoulder 71 for receiving and mounting the monoplate element 70 by its marginal edges in the manner of the substrate. The end plate 68 can have the same configuration as the frame member 12.

The monoplate element 70 is a half-cell that includes a lead foil element 18 that is coated or pasted with active material 74 on one side only. For a positive terminal assembly, the monoplate element 70 includes positive active material on the surface of the lead foil element 18. For a negative terminal assembly, the monoplate element 70 includes negative active material on the surface of the lead foil element 18. The thickness of the end plate 68 is less than the thickness of the frame base member 46 by an amount corresponding to the thickness of one layer of active material. The terminal conductor 72 is a flat, tab-like member that is made of lead or some other suitable conducting material. The terminal conductor 72 is secured to the lead foil element 18 of the substrate 70 on its uncoated surface in an electrically conducting relationship. The terminal conductor 72 extends out through the end plate 68 through a slot 76 through its end wall 78. However, the terminal conductor 72 can be located so as to extend out from the sides of the end plate, for example. The monoplate element 70 is secured to the end plate 68 of the terminal assembly in the same manner as the bipolar element 14 of the bipolar plate assemblies shown in FIGS. 1–2 and 6.

Figure 12:
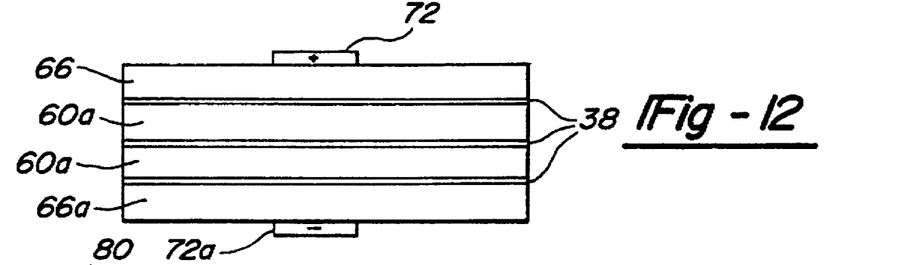
FIG. 12 is a simplified representation of a battery module formed by stacking together a plurality of the bipolar plate assemblies shown in FIGS. 1 or 6.

Referring now to FIG. 12, a bipolar element module 80 for a bipolar battery is formed by stacking together at least one bipolar plate assembly 10 or 44, and in most applications several bipolar plate assemblies, are stacked together with a pair of terminal assemblies 66 and 66a. The substrate of terminal assembly 66 includes positive active material and the substrate of terminal assembly 66a includes negative active material.

In the exemplary embodiment, the bipolar element module 80 includes two bipolar plate assemblies 10 and 10a which are stacked together between the positive terminal assembly 66 and the negative terminal assembly 66a. The positive terminal assembly 66 is located adjacent to the negative side of the bipolar element 10 and the negative terminal assembly 66a is located adjacent to the positive side of the bipolar element 10a. The frame assemblies of the two bipolar plate assemblies space the bipolar elements from one another in the stack. A separator element 38 is located between the bipolar plate assemblies 10 and 10a and between each terminal assembly and the bipolar plate assembly that is adjacent to the terminal assembly in the stack and engaging the active material on the opposing surfaces of the adjacent assemblies. Thus, there is a separator element 38 interposed between the bipolar plate assembly 10a and the positive terminal assembly 66 and engaging the negative active material of the bipolar plate assembly 10a and the positive active material of the positive terminal assembly 66. In addition, a separator 38 located between the bipolar plate assembly 10 and the negative terminal assembly 66a engages the positive active material of the bipolar plate assembly 10 and the negative active material of the negative terminal assembly 66a. The separator elements can be a glass mat, a polymeric separator, a lamination of a thin polymer film on glass mat, or any other state of the art material. The separator elements 38 can be secured to the top surface of the frame assembly as illustrated by the dashed lines in FIGS. 2, 6 and 10, for example.

Preferably, the individual bipolar plate assemblies of the bipolar element module 80 are joined together using the adhesive resin 40. However, the bipolar plate assemblies of the bipolar element module 80 can be joined together using any of the techniques known in the art, such as welding by heat or vibration, using laser or infrared rays, or using sonic welding. Moreover, the stack of bipolar plate assemblies can be wrapped using state of the art wrapping technology. Electrolyte is added in the bipolar element module 80 in the conventional manner using fill openings 84, shown in FIGS. 3 and 10, for example, provided in the frame members 12 and 46. The bipolar element module 80 can be completely sealed or can be allowed to vent.

Figure 13:
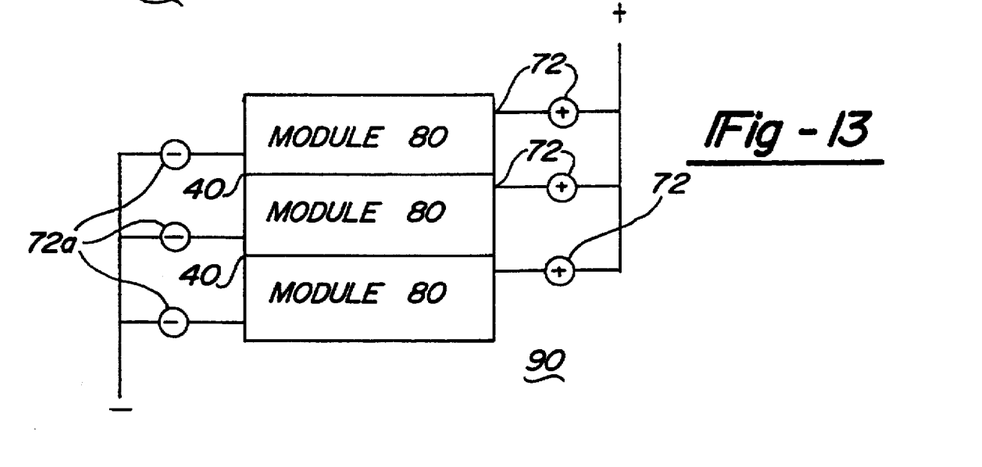
FIG. 13 is simplified representation of a bipolar battery formed by stacking together a plurality of the battery modules shown in FIG. 12.

Referring now to FIG. 13, a bipolar battery 90 in accordance with the invention is comprised of at least one bipolar element module 80, and in most cases is comprised of several of the bipolar element modules 80 illustrated in FIG. 12, which are stacked together to form the bipolar battery. Preferably, the individual bipolar element modules 80 are joined together using the adhesive resin 40. However, the bipolar element modules can be joined together using any of the techniques known in the art, such as welding by heat or vibration, using laser or infrared rays, using sonic welding, or simply connected together by suitable electrical straps, conductors and the like. Alternatively, the bipolar element modules can be secured between two containment plates (not shown) and held together by nuts and bolts. Moreover, one or more bipolar element modules each comprising a stack of bipolar plates can be molded into a case (not shown) using an injection molding process. Electrolyte is added to the bipolar element modules in the conventional manner using the fill openings 84 provided in the frame member. The bipolar element module can be completely sealed or can be allowed to vent.

The bipolar element modules 80 which form the bipolar battery 90 can be wired in parallel for high capacity or in series or high voltage. The bipolar element modules can be stacked in an upright orientation or in a horizontal orientation. Connection of the positive current collectors or tabs 72 and the negative current collectors or tabs 72a can be made at the top of the battery or at the side of the battery. The bipolar battery 90 can be completely sealed or can be allowed to vent.

One bipolar battery that was constructed in accordance with the invention included a positive terminal assembly, a negative terminal assembly, and two bipolar plate assemblies each containing pure lead foil 0.010 inch substrates with $BaPbO_3$ coatings. The bipolar battery was a six volt battery. Two layers of PG140 glass mat AGM separator were imposed between the bipolar plates in each cell. The cells were joined by applying adhesive resin 40 on the frame members and then secured within two polycarbonate blocks using bolts and nuts. About 70 milliliters of sulfuric acid of gravity 1.255 were injected into each cell. The bipolar battery was formed by passing a constant current about 4.21 A/lb positive active material for 48 hours.

The bipolar battery, after formation, was discharged at a current density of about 10.3 $mA/cm^2$ until the voltage reached 5.25 volts. The battery was recharged with 30% overcharge. The reserve capacity of the battery improved in the subsequent cycle. The maximum capacity of 116 minutes, which matched a model prediction, was reached after 7 cycles. The battery was then cooled in a freezer at 0° F. overnight. The battery was then discharged at that temperature at a current density of about 0.29 $A/cm^2$ and 0.44 $A/cm^2$ until the battery voltage reached the knee of the discharge curve. The battery was then recharged with 15% overcharge and the measurement of reserve capacity and cold crank time was repeated. The best recorded cold crank time was 50 and 28 seconds at the rate of 0.29 $mA/cm^2$ and 0.44 V, respectively, as compared with cold crank times of 52 and 30 seconds for the model prediction.

Those skilled in the art can now appreciate that this invention can be implemented in a variety of forms. For example, the dimensions given for the frame member and the lead foil element are provided by way of illustration of one realization of the invention and are not intended as a limitation on the scope of the claims or as to the size and shape of the frame member or lead foil element as well as the other elements of the bipolar plate assembly. Moreover, although a preferred resin adhesive has been disclosed, it should be understood that other adhesives and/or mechanical arrangements can be used for securing the bipolar element to the frame assembly. Therefore, while this invention has been described in connection with particular examples, the true scope of the invention should not be so limited since other modifications will become apparent to the skilled practitioner upon a study of the drawings, specification and the following claims.

What is claimed:

1. A bipolar plate assembly for a bipolar battery comprising:
   a frame member having first and second opposing generally planar surfaces and an opening through said frame member from said first surface to said second surface, said opening being countersunk on said first surface of frame member, defining a mounting shoulder that extends into said opening;
   a bipolar element including a thin substrate of electrically conducting material, said substrate having first and second generally planar substrate surfaces and a peripheral edge, said bipolar element including positive electrode material disposed on said first substrate surface and negative electrode material disposed on said second substrate surface, said positive active electrode material and said negative active electrode material being spaced inwardly from the peripheral edge of said substrate defining a marginal edge portion for said substrate;
   said bipolar element being mounted in said opening of said frame member with said marginal edge portion of said substrate located on said mounting shoulder;
   and securing means including an adhesive resin, said adhesive resin containing at least one of aliphatic chains with carboxylic acid and carboxylate functional groups and aromatic chains, for securing said marginal edge portion of said substrate to said mounting shoulder to thereby secure said bipolar element to said flame member.

2. The bipolar plate assembly according to claim 1, wherein said substrate comprises a generally planar lead foil element.

3. The bipolar plate assembly according to claim 1, wherein said aliphatic chains with carboxylic acid and carboxylate functional groups is selected from the group consisting of tri-(n-octyl, n-decy)trimellitate, triisodecyl trimellitate, poly(hexyl methacrylate), poly(2-ethylhexyl methacrylate), or poly(isodecyl methacrylate) and compounds or mixtures thereof.

4. The bipolar plate assembly according to claim 1, wherein said active electrode material on said first substrate surface is spaced apart from said frame defining a gap between said frame and said active electrode material, and wherein said securing means further comprises a retainer element located in said gap and engaging said marginal edge portion of said substrate.

5. The bipolar plate assembly according to claim 1, wherein said securing means comprises a further frame member mounted on and secured to said first-mentioned frame member, said marginal edge portion of said substrate being clamped between said frame members, said further frame member having an opening therethrough between first and second opposing generally parallel surfaces thereof, said positive active electrode material being located within one of said openings and said negative active material being located within the other one of said openings.

6. The bipolar plate assembly according to claim 5, including a plurality of spaced-apart alignment members projecting from one of said frame members and arranged on said one frame member to extend through said marginal edge portion of said substrate, and a plurality of spaced apart receptors on the other one of said frame members, said receptors being constructed and arranged to receive said alignment members.

7. A bipolar battery structure comprising:
   first and second terminal electrodes having generally planar opposing parallel surfaces which are spaced apart from one another;
   at least one bipolar plate assembly disposed between surfaces of said terminal electrodes to form a bipolar module, said first and second terminal electrodes deeming positive and negative terminals for said bipolar module;
   at least first and second separator members interposed between said at least one bipolar plate assembly and said first and second terminal electrodes, respectively;
   each of said bipolar plate assemblies including a frame member having first and second opposing generally planar surfaces with an opening therethrough between said opposed surfaces, said opening being countersunk on said first surface of frame member, defining a mounting shoulder that extends into said opening; and a bipolar element including a thin substrate having first and second generally planar substrate surfaces with positive and electrode material disposed on one of said substrate surfaces and negative electrode material disposed on the other one of said substrate surfaces, said positive and negative electrode material terminating inwardly of said peripheral edge of said substrate defining a marginal edge portion for said substrate, said bipolar element being mounted in said opening of said flame member with said marginal edge portion located on said shoulder;
   and securing means including an adhesive resin, said adhesive resin containing at least one of aliphatic chains with carboxylic acid and carboxylate functional groups and aromatic chains, for securing said marginal edge portion of said substrate to said mounting shoulder to thereby secure said bipolar element to said frame member.

8. The bipolar battery structure according to claim 7, wherein said substrate comprises a thin, planar foil lead element.

9. The bipolar battery structure according to claim 7, including a plurality of said bipolar modules stacked together and electrically connected in series to form a high voltage multi-cell bipolar battery.

10. The bipolar battery structure according to claim 9, wherein adjacent ones of said bipolar modules are secured to one another by an adhesive resin.

11. The bipolar battery structure according to claim 7, including a plurality of said bipolar modules stacked together and electrically connected in parallel to form a high capacity multi-cell bipolar battery.

12. The bipolar plate assembly according to claim 7, wherein said aliphatic chains with carboxylic acid and carboxylate functional groups is selected from the group consisting of tri-(n-octyl, n-decy)trimellitate, triisodecyl trimellitate, poly(hexyl methacrylate), poly(2-ethylhexyl methacrylate), or poly(isodecyl methacrylate) and compounds or mixtures thereof.

* * * * *